May 12, 1942.　　　　C. A. TEA　　　　2,282,904
DUROMETER
Filed March 18, 1940

INVENTOR
CLARK A. TEA
BY
ATTORNEYS

Patented May 12, 1942

2,282,904

UNITED STATES PATENT OFFICE 2,282,904

DUROMETER

Clark A. Tea, Detroit, Mich., assignor to Insulation Development Corporation, Monroe, Mich., a corporation of Michigan Application March 18, 1940, Serial No. 324,667

4 Claims. (Cl. 265—12)

This invention relates generally to durometers and refers more particularly to improvements in hardness testing equipment of the type employed to determine the hardness of resilient materials, such as rubber or substitutes for rubber.

In testing the hardness of materials of the above general type, it has been proposed to utilize an instrument having a foot or bearing engageable with the stock to be tested and having a pin normally urged to a position beyond the foot by a spring. In use, the foot is merely placed on the surface of the stock to be tested and the amount of extension of the pin into the stock caused by the spring represents the hardness or compressibility of the stock. Instruments of this type, however, are not very accurate because the spring acting on the pin is affected by the temperature of the ambient air and the tension of this spring varies in proportion to the deflection of the spring. As a result, it is difficult to accurately predetermine the force acting upon the pin and any variation in this force causes a corresponding inaccuracy in indicating the hardness or compressibility of the stock.

It is, therefore, one of the principal objects of this invention to overcome the inaccuracy of spring operated instruments by providing a construction wherein springs or their equivalent are eliminated and wherein the force acting upon the pin may not only be accurately predetermined but remains constant under practically all conditions under which the instrument is used.

Another advantageous feature of the present invention resides in the provision of a relatively simple, compact, portable instrument capable of being easily handled and composed of a relatively few simple parts which lend themselves to economical manufacture and assembly.

The foregoing, as well as other objects, will be made more apparent as this description proceeds, especially when considered in connection with the accompanying drawing, wherein:

Figure 3 is a cross sectional view taken substantially on the plane indicated by the line 3—3 of Figure 2;

Figure 4 is a cross sectional view taken substantially on the plane indicated by the line 4—4 of Figure 2.

Figures 1, 2:
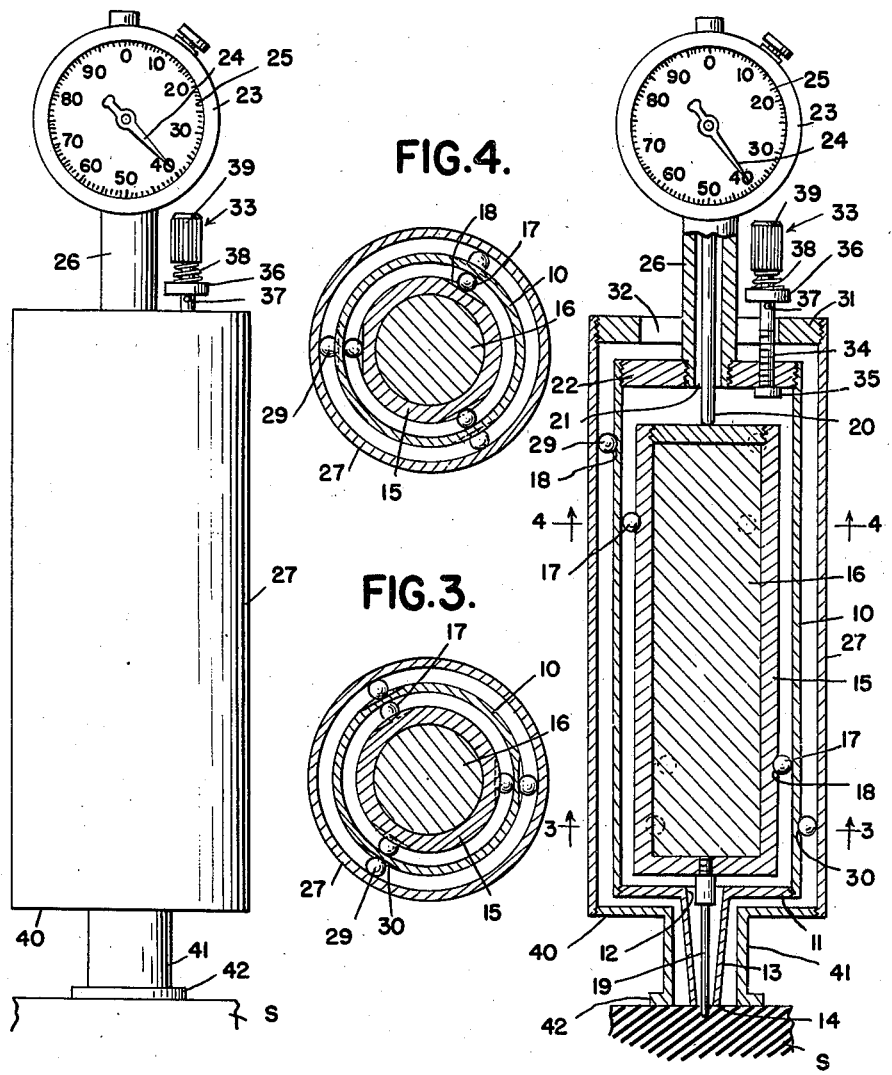
Figure 1 is a side elevational view of an instrument constructed in accordance with this invention.
Figure 2 is a longitudinal sectional view through the instrument shown in Figure 1.

Upon reference to Figure 2, it will be noted that my improved hardness testing instrument comprises a vertical tubular member 10 having a bottom wall 11 formed with a centrally arranged opening 12 therethrough and provided with a downwardly projecting frusto-conical tube portion 13 concentrically arranged with respect to the axis of the tubular member 10. The end of maximum diameter of the frusto-conical projection 13 surrounds the central opening 12 in the bottom wall of the tubular member 10 and the end of minimum diameter of the projection forms a reference foot 14 for engagement with the surface of the stock S to be tested.

Located within the tubular member 10 is a vertical tube 15 having the opposite ends closed to form a container for a mass of material 16 of predetermined weight. The outside diameter of the tube 15 is less than the inside diameter of the tube 10 and the tube 15 is supported in concentric relation to the axis of the tube 10 for vertical sliding movement relative to the latter tube by means of a plurality of ball bearings 17. Upon reference to Figure 4, it will be noted that the upper end of the tube 15 is supported by three sets of ball bearings spaced equal distances from each other circumferentially of the tube 15 and respectively arranged in grooves 18 formed in the periphery of the tube 15. The lower end of the tube 15 is similarly supported with the result that the tube 15 may be readily moved relative to the tube 10 with the minimum amount of friction.

The mass 16 is actuated by gravity to normally urge the bottom wall of the tube 15 toward or into seating engagement with the bottom wall 11 of the tube 10. As shown in Figure 2, a pin 19 is secured centrally to the bottom wall of the tube 15 and projects axially through the frusto-conical projection 13. The pin 19 has a spherically shaped lower end portion and is of sufficient length to extend substantially beyond the reference foot 14 when the bottom wall of the tube 15 is in seating relation with the bottom wall 11 of the tube 10.

The upper end wall of the tube 15 abuts the lower end of a plunger 20 supported in axial alignment with the tube 15. The plunger 20 extends upwardly through a central opening 21 formed in the top wall 22 of the tube 10 and is operatively connected to a suitable gauge 23 in a manner (not shown) to move the indicating needle 24 of the gauge relative to a graduated dial 25 on the gauge. The gauge 23 is secured to the top wall 22 of the tube 10 by means of a sleeve 26 having the lower end secured to the top wall 22 of the tube 10 and having the upper end fixed to the gauge casing. The sleeve 26 is of sufficient internal diameter to freely receive the plunger 20.

In order to permit handling of the gauge, the tube 10 is located within a third tube 27 having a diameter substantially greater than the diameter of the tube 10 and supported for vertical sliding movement relative to the tube 10 by means of ball bearings 29 supported adjacent opposite ends of the tube 10. Upon reference to Figure 3, it will be noted that the ball bearings at the lower end of the tube 10 are arranged in three groups spaced equal distances from each other around the periphery of the tube 10 and retained in grooves 30 formed in the outer surface of the tube 10. The upper end of the tube 27 is similarly supported on the tube 10 with the result that the tube 10 may be readily vertically moved relative to the handle tube 27 with the minimum amount of friction.

The upper end of the handle tube 27 is provided with a top wall 31 having a relatively large central opening 32 therethrough for receiving the gauge supporting sleeve 26. It will also be noted from Figure 2 that the opening 32 in the top wall of the tube 27 is of sufficient size to accommodate a locking device 33. This device comprises a screw 34 threadedly engageable with the top wall 22 of the tube 10 and having a head 35 at the lower end adapted to abut the top wall of the container or tube 15. The arrangement is such that when the screw 34 is moved to its lowermost position, the head 35 contacts the top wall of the tube or container 15 and holds the bottom wall of the container 15 in engagement with the bottom wall 11 of the tube 10. As a result, relative movement between the tubes 10 and 15 is prevented. It will also be noted from Figure 2 that the screw 34 has a collar 36 slidably mounted thereon and normally urged into engagement with a stop 37 on the screw by means of a spring 38. The spring 38 surrounds the portions of the screw above the collar with one end abutting the collar and with the opposite end engaging the finger engaging piece 39 on the upper end of the screw. The collar 36 engages the top wall of the handle tube 27 when the screw is moved to its locked position with respect to the tubes 10 and 15. It follows, therefore, that the locking device 33 functions to hold the several parts of the instrument from relative movement and this is desirable when the instrument is being transported or when not in use.

The lower end of the handle tube 27 is provided with a bottom wall 40 having a reduced downwardly extending tubular projection 41 surrounding the frusto-conical projection 13 on the tube 10 and having an annular outwardly extending flange 42 forming a contact foot for engagement with the surface of the material to be tested. The diameter of the contact foot 42 is substantially greater than the diameter of the reference foot 14 and assists in properly positioning the instrument on the surface of the stock to be tested. In other words, the foot 42 assists the operator in holding the instrument in an upright position on the surface of the stock and minimizes the tendency to tilt the instrument during the testing operation and obtaining an inaccurate reading.

Operation

In use, the instrument described above is supported with the contact foot 42 on a hard relatively non-compressible surface so that the reference foot 14 and lower end of the pin 19 assume positions in a common plane. The gauge 23 is then adjusted so that the indicating needle 24 registers zero on the graduated dial 25. When this adjustment has been accomplished, the instrument is ready for use to determine the hardness or compressibility of the material to be tested. For the purpose of illustration, it will be assumed that the material to be tested is in the form of a rubber block, designated by the reference character S in Figure 2.

The instrument is supported in an upright position on the rubber block S with the contact foot bearing on the surface of the block. During this operation, the reference foot 14 engages the surface of the block and the tube 10 is raised relative to the handle tube 27 to locate the reference foot 14 in the plane of the contact foot 42. Inasmuch as the pin 19 projects downwardly beyond the lower end of the reference foot 14, it follows that this pin also contacts the stock and tends to move the container 15 upwardly relative to the tube 10. The upward movement of the pin 19 relative to the tube 10 is resisted by the dead weight of the mass 16 and the extent of this movement depends upon the hardness or compressibility of the block S. Also, in view of the fact that the gauge 23 is operated by the container 15 or mass 16 in the container, it follows that any upward movement of the pin 19 is registered or indicated by the gauge 23.

Thus, from the foregoing, it will be observed that I have provided a hardness testing instrument which operates on the dead weight principle and thereby eliminates the inaccuracies inherently present in the springs usually employed in hardness testing equipment. It will also be noted that I have provided a relatively simple, compact instrument capable of being easily manipulated and requiring the minimum adjustment preparatory to testing the material.

What I claim as my invention is:

1. In a hardness testing instrument, a tubular member having a reference foot at the lower end engageable with the stock to be tested, a tubular container slidable in said member and containing a weight normally urging the container in a direction toward said foot, ball bearings located adjacent opposite ends of the container and positioned between the side walls of the container and tubular member, a pin extending downwardly from the bottom of the container through the reference foot to a position beyond the plane of said foot for engagement with the stock to be tested, an outer tubular member supported for movement relative to the first named tubular member and having a portion surrounding the reference foot for engagement with the stock to properly position the reference foot on the stock, and ball bearings located adjacent opposite ends of the outer tubular member and positioned between the walls of the latter member and said first named member.

2. In a hardness testing instrument, a tubular member having a reference foot at the lower end engageable with the stock to be tested, a tubular container slidable in said member and containing a weight normally urging the container in a direction toward said foot, a pin extending downwardly from the bottom of the container through the reference foot to a position beyond the plane of said foot for engagement with the stock to be tested, an outer tubular member supported for movement relative to the first named tubular member and having a portion surrounding the reference foot for engagement with the stock to properly position the reference foot on the stock, and means accessible for manipulation by the operator for securing both the tubular members and container against relative movement.

3. In a hardness testing instrument, a tubular member having a reference foot at the lower end engageable with the stock to be tested, a tubular container slidable in said member and containing a weight normally urging the container in a direction toward said foot, ball bearings located adjacent opposite ends of the container and positioned between the side walls of the container and tubular member, a pin extending downwardly from the bottom of the container through the reference foot to a position beyond the plane of said foot for engagement with the stock to be tested, an outer tubular member supported for movement relative to the first named tubular member and having a portion surrounding the reference foot for engagement with the stock to properly position the reference foot on the stock, ball bearings located adjacent opposite ends of the outer tubular member and positioned between the walls of the latter member and said first named member, and a locking device carried by the first named tubular member and engageable with the container and second mentioned tubular member to hold said parts against relative movement.

4. In a hardness testing instrument, a tubular member having a reference foot at the lower end engageable with the stock to be tested, a member slidable in the tubular member and having a cylindrical side wall spaced from the adjacent wall of the tubular member, anti-friction elements located adjacent opposite ends of the second member and positioned between the side walls of the members to support the second member in concentric relation to the first member, a pin extending downwardly from the lower end of the second member through the reference foot on the first member, an outer tubular member for receiving the first tubular member and having a portion at the lower end surrounding the reference foot and engageable with the stock to be tested, and antifriction elements located adjacent opposite ends of the first tubular member between the side wall of the latter and the adjacent wall of the outer tubular member in rolling engagement with the latter members.

CLARK A. TEA.